United States Patent
Ushiyama et al.

[19]

[11] Patent Number: 6,084,714
[45] Date of Patent: Jul. 4, 2000

[54] POLARIZING ILLUMINATION DEVICE AND PROJECTION DISPLAY DEVICE

[75] Inventors: Tomiyoshi Ushiyama, Minowa-machi; Akitaka Yajima, Tatsuno-machi, both of Japan

[73] Assignee: Seiko Epson Corporation, Tokyo, Japan

[21] Appl. No.: 09/236,467

[22] Filed: Jan. 25, 1999

[30] Foreign Application Priority Data

Feb. 16, 1998 [JP] Japan ................................. 10-051363

[51] Int. Cl.⁷ ............................ G02B 27/10; G02B 5/30
[52] U.S. Cl. .......................................... 359/627; 359/487
[58] Field of Search .................................. 359/619, 620, 359/621, 622, 627, 629, 487, 497; 349/9; 353/20

[56] References Cited

U.S. PATENT DOCUMENTS 5,757,547  5/1998  Rodman et al. ......................... 359/497
5,835,120  11/1998  Hamano et al. ......................... 347/241
5,978,136  11/1999  Ogawa et al. ........................... 359/487

*Primary Examiner*—Ricky Mack
*Attorney, Agent, or Firm*—Oliff & Berridge, PLC

[57] ABSTRACT

A technique for preventing a decrease in the amount of effective polarized light that emerges from a polarizing conversion element array is provided. To this end, a polarizing illumination device includes a polarizing conversion element array that converts light emitted from a light source into one type of linearly polarized light, and a plurality of light-shielding portions for blocking a part of light that is incident on the polarizing conversion element array. The polarizing conversion element array is divided into effective incident areas for emitting effective polarized light, and ineffective incident areas for emitting ineffective polarized light. The widths of the plurality of light-shielding portions are set to be smaller than the width of the ineffective incident areas of the polarizing conversion element array, so that light to be incident on the effective incident areas is not blocked. This makes it possible to prevent a decrease in the amount of effective polarized light that emerges from the polarizing conversion element array.

8 Claims, 10 Drawing Sheets

PREPERATION OF PLATE MEMBERS

BONDING

CUTTING OUT

POLARIZING ILLUMINATION DEVICE AND PROJECTION DISPLAY DEVICE

BACKGROUND OF THE INVENTION

1. Field of Invention

The present invention relates to a polarizing illumination device for generating about one type of polarized light, and to a projection display device including this polarizing illumination device.

2. Description of Related Art

In a projection display device, an element, called a light valve, is used to modulate light according to image signals. In most cases, light valves using only one type of linearly polarized light, such as a transmission liquid crystal panel, or a reflective-type liquid crystal panel, are used. Such a projection display device using one type of linearly polarized light includes a polarizing conversion element array that converts unpolarized incident light emitted from a light source into one type of linearly polarized light (e.g., s-polarized light). FIGS. 1(a)–(b) are explanatory views of a polarizing conversion element array. As shown in FIG. 1(a), such a polarizing conversion element array 320 includes polarization separating films 331 for separating incident light into p-polarized light and s-polarized light, and reflecting films 332. On the light emitting surface of the polarizing conversion element array, $\lambda/2$ phase layers 381 are selectively formed to unite two separated polarized lights into one type of polarized light.

The incident surface of the polarizing conversion element array 320 is divided into effective incident areas $EA_0$ and ineffective incident areas $UA_0$. Light that is incident on the effective incident areas $EA_0$ is finally converted into s-polarized light, emitted, and guided to a light valve that is not shown. In the example shown in FIGS. 1(a)–(b), it is assumed that the object to be modulated by the light valve is s-polarized light. In other words, light that is incident on the effective incident areas $EA_0$ is converted into effective linearly polarized components that are to be modulated by the light valve. On the other hand, if light enters the ineffective incident areas $UA_0$, this light is converted into p-polarized light, and emerges from the polarizing conversion element array 320. This p-polarized light is an ineffective linearly polarized light component that is absorbed by a polarizer disposed on the light incident side of the light valve, thereby generating heat. Since such heat generation deteriorates the light valve, it is preferable that effective linearly polarized light components be limited to the smallest possible amount. Accordingly, in order to minimize the emergence of unnecessary linearly polarized light (p-polarized light), light-shielding portions 316 are disposed to block light that is incident on the ineffective incident areas $UA_0$.

SUMMARY OF THE INVENTION

Because of the dimensional tolerances in manufacturing and the positioning errors of the polarizing conversion element array, however, the positions of the polarizing conversion element array 320 and the light-shielding portions 316 are often offset from each other, as shown in FIG. 1(b). In such a case, overlapping portions F are formed between the effective incident areas $EA_1$ and the light-shielding portions 316, and a part of light that is incident on the effective incident areas $EA_1$ is blocked by the light-shielding portions 316, whereby the amount of effective linearly polarized light is reduced. Such a problem is not confined to a polarizing conversion element array for use in a device having a light valve, and, in general, is common to polarizing conversion element arrays for generating about one type of polarized light.

The present invention has been made to solve the aforesaid problems in the related art, and an object of the invention is to provide a technique for preventing a decrease in the amount of effective polarized light that emerges from a polarizing conversion element array.

In order to solve at least a part of the aforesaid problems, a first device of the present invention is a polarizing illumination device that generates about one type of polarized light, including a light source, a polarizing conversion element array that converts light emitted from the light source into one type of linearly polarized light, and a plurality of light-shielding portions that blocks a part of light that is incident on the light incident surface of the polarizing conversion element array, the polarizing conversion element array including a polarizing beam splitter array that separates the light from the light source into a first type of linearly polarized light and a second type of linearly polarized light, i.e., s-polarized light and p-polarized light, and a selective phase plate selectively disposed on the light emitting surface of the polarization beam splitter array to convert one of the two types of linearly polarized lights into the other of the two types of linearly polarized light, the polarization beam splitter array having a plurality of polarization separating films and a plurality of reflecting films alternately arranged along a predetermined direction with an arrangement space therebetween, the plurality of light-shielding portions being arranged nearly in parallel with the predetermined direction and having set widths, and the widths of the plurality of light-shielding portions along the predetermined direction being smaller than the arrangement space between the polarization separating films and the reflecting films along the predetermined direction.

In this polarizing illumination device, since the widths of the light-shielding portions are set to be smaller than the arrangement space between the polarization separating films and the reflecting films, even when the polarizing conversion element array has dimensional errors or when errors arise in positioning the polarizing conversion element array and a polarizing portion, there is a small likelihood that the light-shielding portions will shield effective incident areas of the polarizing conversion element array. Therefore, it is possible to prevent a decrease in the amount of effective linearly polarized light that emerges from the polarizing conversion element array.

In the polarizing illumination device, it is preferable that the plurality of light-shielding portions be arranged so that distances therebetween increase from the center of the polarizing conversion element array.

In this case, when the actual dimensions of the polarizing conversion element array are apt to be larger than the basic dimensions, the dimensional errors reduce the likelihood that the light-shielding portions will shield the effective incident areas of the polarizing conversion element array. Therefore, it is possible to further prevent a decrease in the amount of effective linearly polarized light that emerges from the polarizing conversion element array.

In the polarizing illumination device, it is preferable that the plurality of light-shielding portions be arranged so that the distances therebetween decrease from the center of the polarizing conversion element array.

In this case, when the actual dimensions of the polarizing conversion element array are apt to be smaller than the basic dimensions, the dimensional errors reduce the likelihood that the light-shielding portions will shield the effective incident areas of the polarizing conversion element array. Therefore, it is possible to further prevent a decrease in the amount of effective linearly polarized light that emerges from the polarizing conversion element array.

In the polarizing illumination device, it is preferable that the widths of the plurality of light-shielding portions be set to decrease from the center of the polarizing conversion element array.

The light-shielding portions are likely to shield the effective incident areas to a greater extent with distance from the center of the polarizing conversion element array. When the widths of the light-shielding portions vary in such a manner, however, there is a small likelihood that the light-shielding portions will shield the effective incident areas of the polarizing conversion element array even if they are apart from the center of the polarizing conversion element array. Therefore, it is possible to further prevent a decrease in the amount of effective linearly polarized light that emerges from the polarizing conversion element array.

A second device of the present invention is a projection display device that displays an image on a screen by projecting light onto the screen, the projection display device including a polarizing illumination device that generates about one type of polarized light, a modulation device that modulates emitting light from the polarizing illumination device according to a given image signal, and a projection optical device that projects the light modulated by the modulation device, the polarizing illumination device including a light source, a polarizing conversion element array that converts light emitted from the light source into one type of linearly polarized light, and a plurality of light-shielding portions that block a part of light that is incident on the light incident surface of the polarizing conversion element array, the polarizing conversion element array including a polarization beam splitter array that separates the light from the light source into a first type of linearly polarized light and a second type of linearly polarized light, i.e., s-polarized light and p-polarized light, and a selective phase plate selectively disposed on the light emitting surface of the polarization beam splitter array to convert one of the two types of linearly polarized lights into the other of the two types of linearly polarized lights, the polarization beam splitter array having a plurality of polarization separating films and a plurality of reflecting films alternately arranged along a predetermined direction with an arrangement space therebetween, the plurality of light-shielding portions being arranged nearly in parallel with the predetermined direction and having set widths, and the widths of the plurality of light-shielding portions along the predetermined direction being smaller than the arrangement space between the polarization separating films and the reflecting films along the predetermined direction.

Since this projection display device has the polarizing illumination device according to the above-described first invention, it is possible to prevent a decrease in the amount of effective linearly polarized light that is supplied to the modulation device. Therefore, it is possible to prevent a decrease in the brightness of an image that is projected by the projection display device.

DETAILED DESCRIPTION OF PREFERRED EMBODIMENTS

Figure 1A:
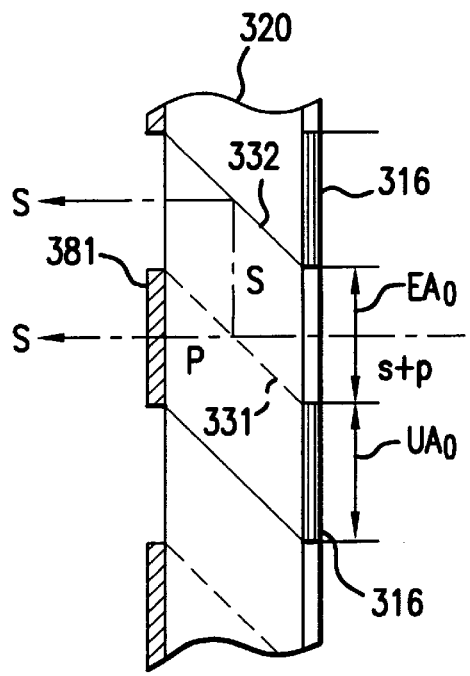
FIGS. 1(a)–(b) are explanatory views of a polarizing conversion element array.
Figure 1B:
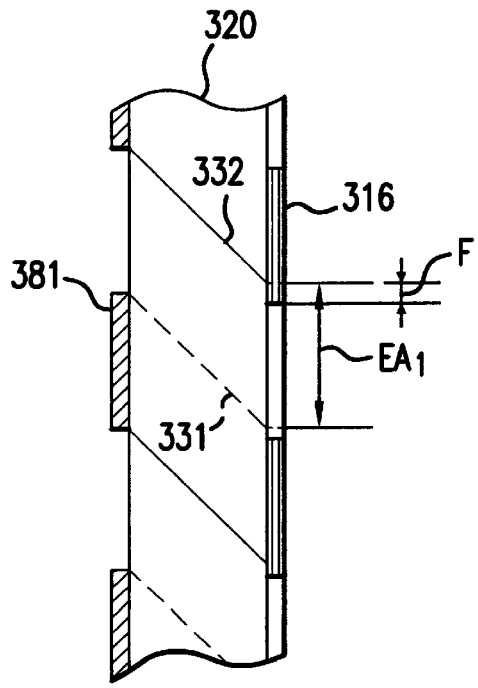
Figure 2:
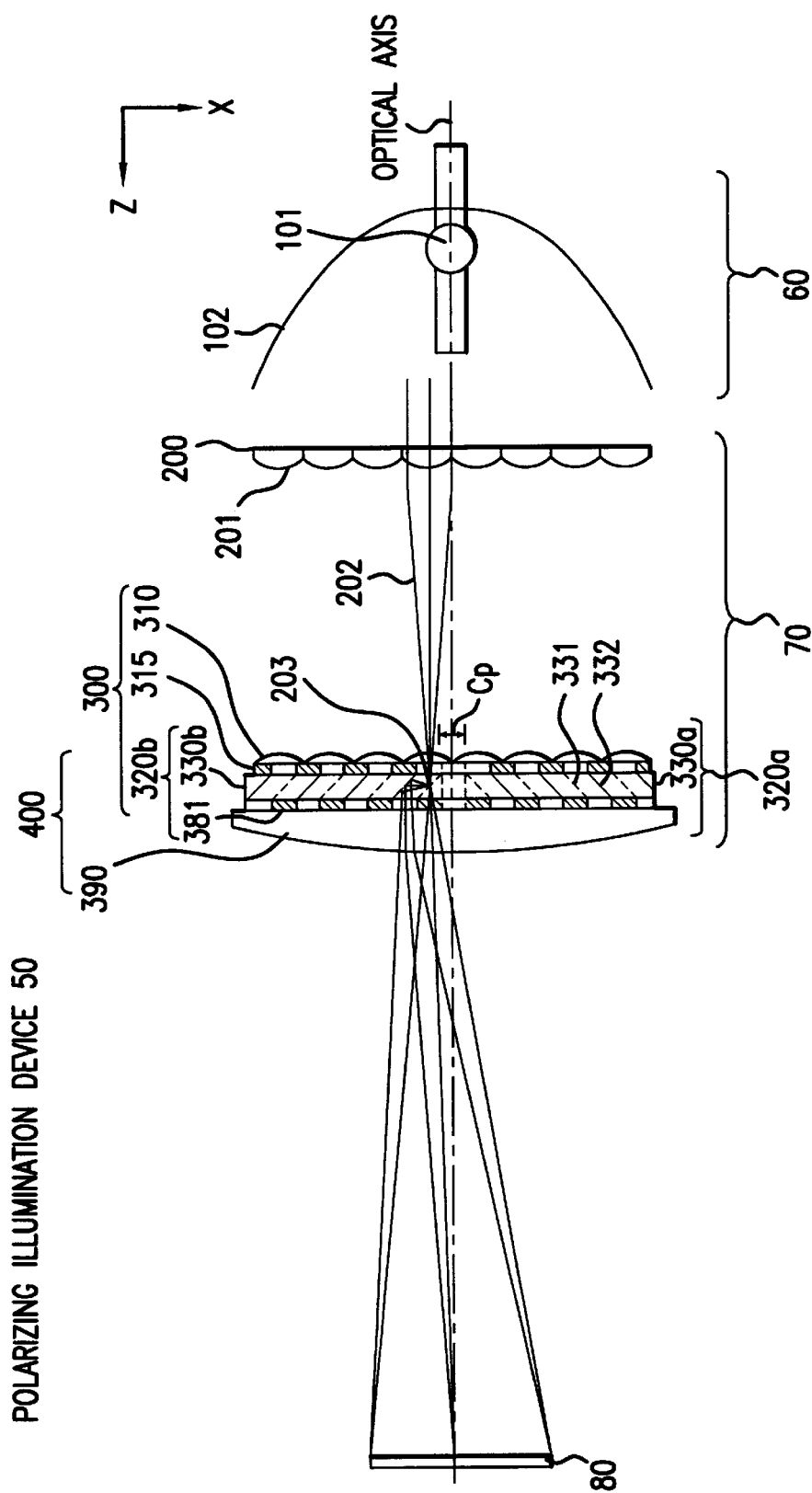
FIG. 2 is a schematic structural plan view showing the principal part of a polarizing illumination device 50 according to a first embodiment of the present invention.

Modes for carrying out the present invention will be described with reference to embodiments. FIG. 2 is a schematic structural plan view showing the principal part of a polarizing illumination device 50 according to a first embodiment of the present invention. This polarizing illumination device 50 includes a light source 60 and a polarized light generator 70. The light source 60 emits a light beam that is polarized in random directions and that includes an s-polarized light component and a p-polarized light component. A light beam emitted from the light source 60 is converted by the polarized light generator 70 into one type of linearly polarized light polarized in almost the same direction (e.g., s-polarized light), and illuminates an illumination area 80.

The light source 60 includes a light-source lamp 101 and a parabolic reflector 102. Light radiated from the light-source lamp 101 is reflected in one direction by the parabolic reflector 102, is converted into a nearly parallel light beam, and enters the polarized light generator 70.

Figure 3:
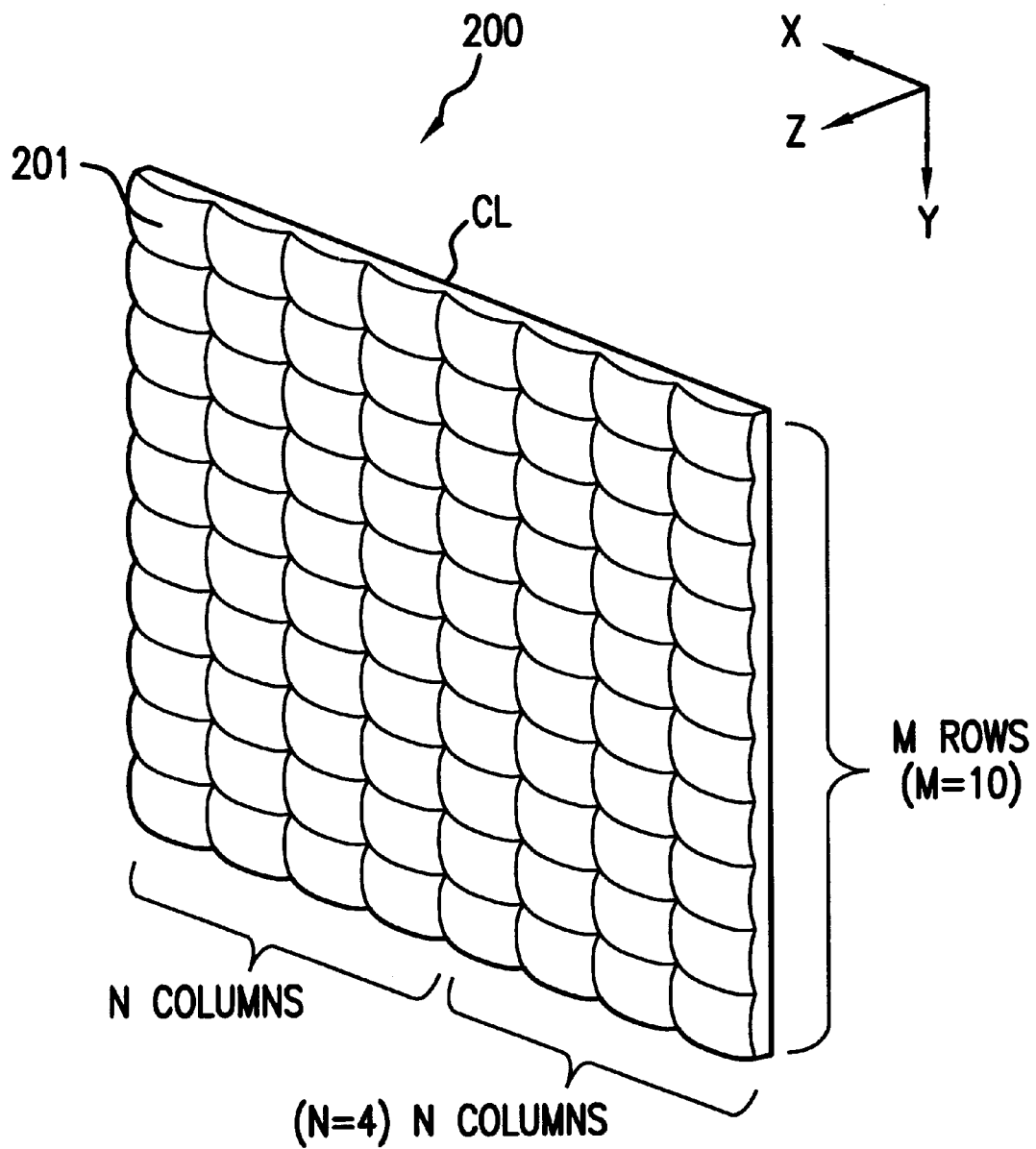
FIG. 3 is a perspective view of a first optical element 200.

The polarized light generator 70 includes a first optical element 200 and a second optical element 400. FIG. 3 is a perspective view of the first optical element 200. The first optical element 200 is composed of beam-splitting lenses 201, each having a rectangular outline, arranged in a matrix with M rows and 2N columns. Therefore, there are N columns on the left side and N columns on the right side of the center line CL in the lateral direction of the lenses. In this embodiment, M is 10 and N is 4. The first optical element 200 is placed so that the optical axis aligns with the center of the first optical element 200. The outer shape of the beam-splitting lenses 201, viewed from the z direction, is set almost similar to the shape of the illumination area 80. In this embodiment, since it is assumed that the illumination area 80 is long sideways in the x direction, the outer form of the beam-splitting lenses 201 in the XY plane is also long sideways.

The second optical element 400 (FIG. 2) includes an optical device 300 and an emitting-side lens 390. The optical device 300 and the emitting-side lens 390 are arranged so that the centers thereof align with the optical axis.

The optical device 300 includes a condenser lens array 310, a light-shielding plate 315, and two polarizing conversion element arrays 320a and 320b. The condenser lens array 310 is a lens array having the same structure as the first optical element 200, and is disposed to face the first optical element 200. The condenser lens array 310 serves to collect a plurality of split beams, which are split by the beam-splitting lenses 201, and to guide the beams to effective incident areas (that will be described later) of the polarizing conversion element arrays 320a and 320b, in conjunction with the first optical element 200. The light-shielding plate 315 serves to block light that is incident on ineffective incident areas (that will be described later) of the polarizing conversion element arrays 320a and 320b. That is, the light-shielding plate 315 is placed to prevent light, which is not collected into the effective incident areas of the polarizing conversion element arrays 320a and 320b by the condenser lens array 310, from entering the ineffective incident areas. The polarizing conversion element arrays 320a and 320b serve to convert light beams that are incident on the effective incident areas into one type of linearly polarized light (e.g., s-polarized light), and to then emit the converted light. The polarizing conversion element arrays 320a and 320b include polarization beam splitter arrays 330a and 330b for separating light, which is emitted from the light source 60 and is collected by the condenser lens array 310, into two types of linearly polarized lights, s-polarized light and p-polarized light, and a $\lambda/2$ phase layer 381 for converting one of the two types of linearly polarized lights emerging from the polarization beam splitter arrays 330a and 330b into the other linearly polarized light.

The emitting-side lens 390 shown in FIG. 2 superimposes a plurality of split beams emerging from the optical device 300 (split beams of linearly polarized light converted by the polarizing conversion element arrays 320a and 320b) onto the illumination area 80.

Figure 4A:
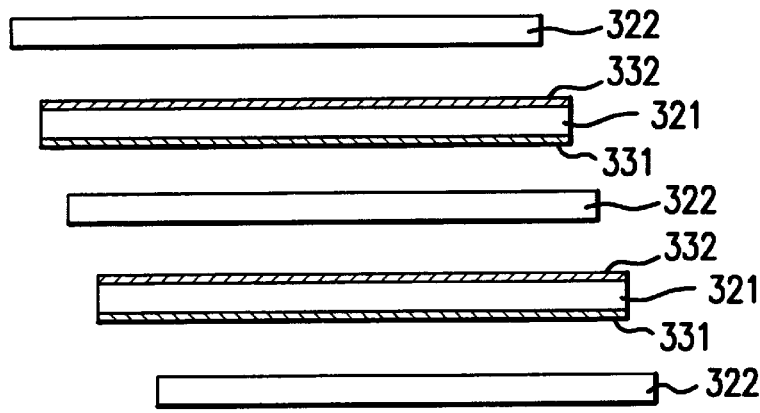
FIGS. 4(a)–(c) are cross-sectional views showing principal process of manufacturing polarization beam splitter arrays 330a and 330b.
Figure 4B:
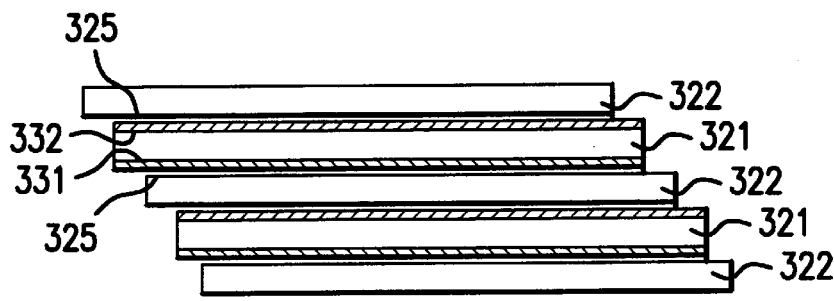
Figure 4C:
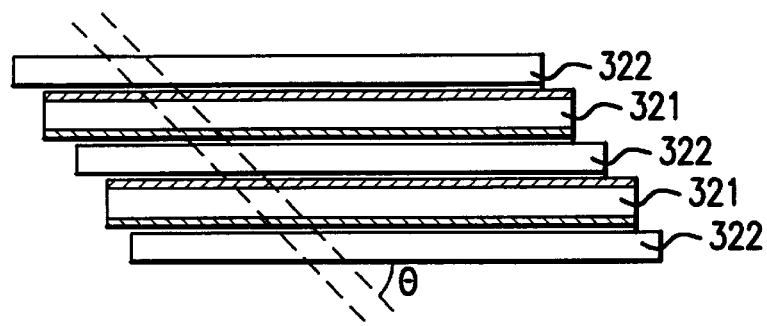

FIGS. 4(a)–(c) are cross-sectional views showing the principal processes of manufacturing the polarization beam splitter arrays 330a and 330b.

In the process shown in FIG. 4(a), a plurality of first light transmissive plates 321 and a plurality of second light transmissive plates 322, both being in the shape of a plate, are prepared. A polarization separating film 331 is formed on one of two nearly parallel surfaces (film-formed surfaces) of a first light transmissive plate 321. On the other surface, a reflecting film 332 is formed. The surfaces of a second light transmissive plate 322 do not have these films. As the first and second light transmissive plates 321 and 322, polished glass plates are used.

The polarization separating film 331 is a film that has the property of selectively transmitting one of s-polarized light and p-polarized light and of selectively reflecting the other. In usual cases, the polarization separating film 331 is formed by positioning dielectric multilayer films having such a property one on top of another.

The reflecting film 332 selectively reflects only linearly polarized light (s-polarized light or p-polarized light) reflected by the polarization separating film 331, and does not reflect the other linearly polarized light. The reflecting film 332 is formed by positioning dielectric multilayer films one on top of another. The reflecting film 332 may be formed by evaporating aluminum.

In the process shown in FIG. 4(b), the first and second light transmissive plates 321 and 322 are alternately bonded with an optical cement. After bonding, optical cement layers 325 are hardened by being irradiated with ultraviolet rays. As a result, the optical cement layers 325 are formed between the polarization separating films 331 and the second light transmissive plates 322 and between the reflecting films 332 and the second light transmissive plates 322. In FIGS. 4(a)–(c), the layers 331, 332, and 325 are exaggerated in thickness for convenience of illustration. Moreover, all glass plates to be bonded are not shown.

In the process shown in FIG. 4(c), a plurality of light transmissive plates 321 and 322, which have been thus alternately bonded, are cut in almost parallel along cutting surfaces (shown by broken lines) that form a predetermined angle θ with the surfaces thereof, thereby cutting out an optical device block. It is preferable that the value θ be about 45°. By cutting both ends of the optical device block, the polarization beam splitter array 330a or 330b is produced.

Figure 5:
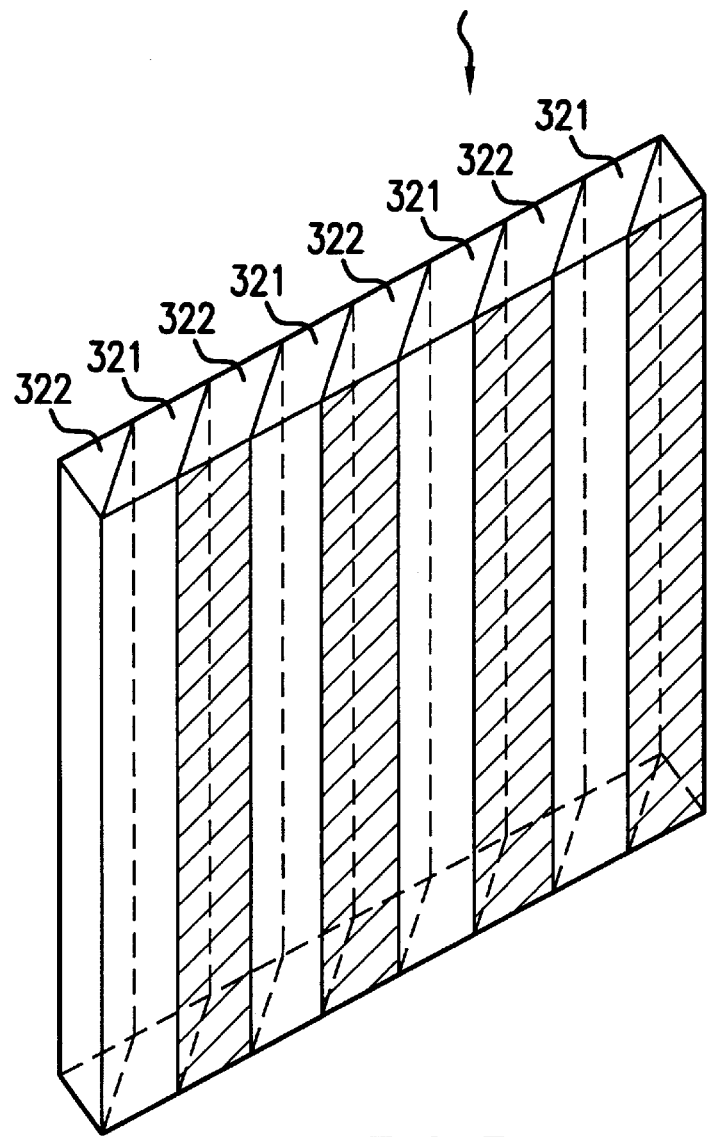
FIG. 5 is a perspective view of the polarization beam splitter arrays 330a and 330b.

FIG. 5 is a perspective view of the polarization beam splitter array 330a or 330b that has been thus produced. As this figure demonstrates, the polarization beam splitter array 330a or 330b is shaped such that the first and second prismatic light transmissive plates 321 and 322, having a parallelogrammatic cross section, are alternately bonded. Between these light transmissive plates 321 and 322, a plurality of polarization separating films 331 and a plurality of reflecting films 332 are arranged along a predetermined direction. In the polarizing conversion element arrays 320a and 320b, the $\lambda/2$ phase layers 381 are disposed at the portions of the polarization beam splitter arrays 330a and 330b that are diagonally shaded in the figure. As shown in FIG. 2, the polarizing conversion element arrays 320a and 320b are positioned so that the polarization separating films 331 and the reflecting films 332 thereof face each other.

Figure 6:
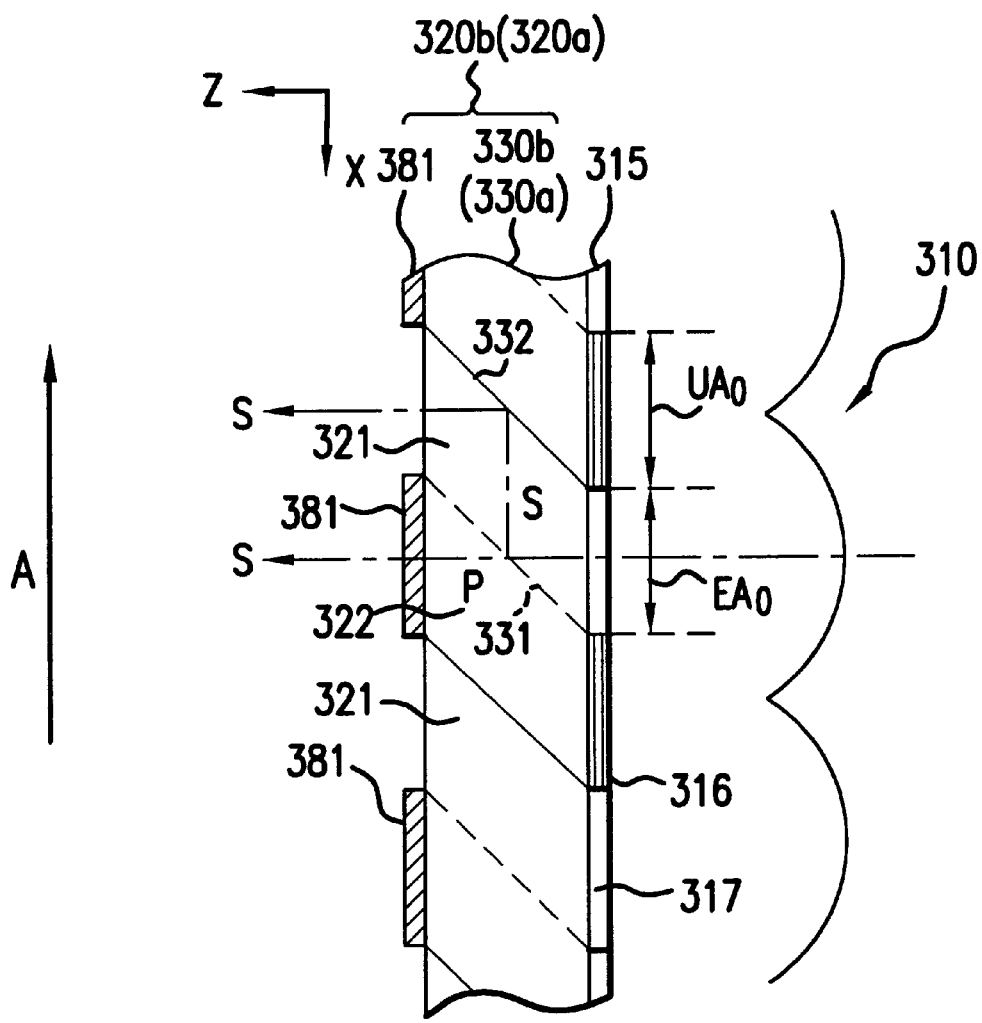
FIG. 6 is an explanatory view showing the function of a polarizing conversion element array 320b (320a).

FIG. 6 is an explanatory view showing the function of the polarizing conversion element array 320b (320a). The incident surface of the polarizing conversion element array 320b is divided into effective incident areas $EA_0$ and ineffective incident areas $UA_0$ that are almost equal in width. On the incident surface of the polarizing conversion element array 320b, the light-shielding plate 315 is disposed. The light-shielding plate 315 includes a plurality of light-shielding portions 316 and a plurality of open portions 317 that are arranged nearly in parallel with the arrangement direction (predetermined direction A) of the polarization separating films 331 and the reflecting films 332 in the polarization beam splitter array 330b. Light emitted from the light source 60 contains s-polarized light and p-polarized light, and most of the light is collected by the condenser lens array 310, and enters the effective incident areas $EA_0$ via the open portions 317. Light that is incident on the effective incident area $EA_0$ is first separated into s-polarized light and p-polarized light by the polarization separating film 331. The s-polarized light is reflected by the polarization separating film 331 almost perpendicularly to the direction of incidence, is further reflected perpendicularly by the reflecting film 332, and is then emitted. On the other hand, the p-polarized light passes unchanged through the polarization separating film 331. The $\lambda/2$ phase layer 381 is disposed on the surface where the p-polarized light having passed through the polarization separating film emerges, and this p-polarized light is converted into s-polarized light and is then emitted. Therefore, most of the light having passed through the polarizing conversion element array 320b emerges as s-polarized light. In order to cause p-polarized light to emerge from the polarizing conversion element array, the $\lambda/2$ phase layers 381 are disposed on the surface portions where s-polarized light reflected by the reflecting films 332 emerges.

Supposing that the light-shielding plate 315 is not disposed in FIG. 6, light also enters the ineffective incident areas $UA_0$. In this case, the reflecting films 332 function as polarization separating films for the light that is incident on the ineffective incident areas $UA_0$, and the polarization separating films 331 function as reflecting films. Therefore, the light, which is incident from the ineffective incident areas $UA_0$ of the polarizing conversion element array, emerges as p-polarized light. That is, if the light-shielding plate 315 is not placed, even when emitting light including only s-polarized light need to be obtained, light including p-polarized light emerges from the polarizing conversion element array 320b. The light-shielding plate 315 prevents undesirable polarized light (p-polarized light in this embodiment) from being mixed in with desired polarized light (s-polarized light in this embodiment).

Figure 7A:
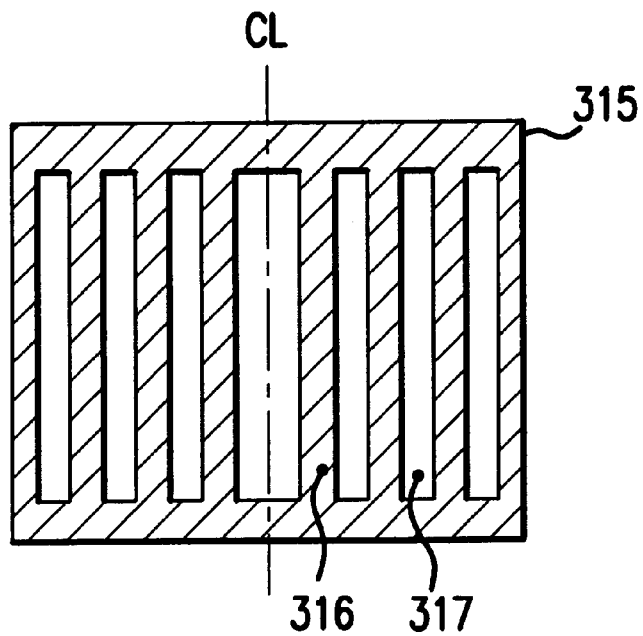
FIGS. 7(a)–(b) are plan views of a light-shielding plate 315.
Figure 7B:
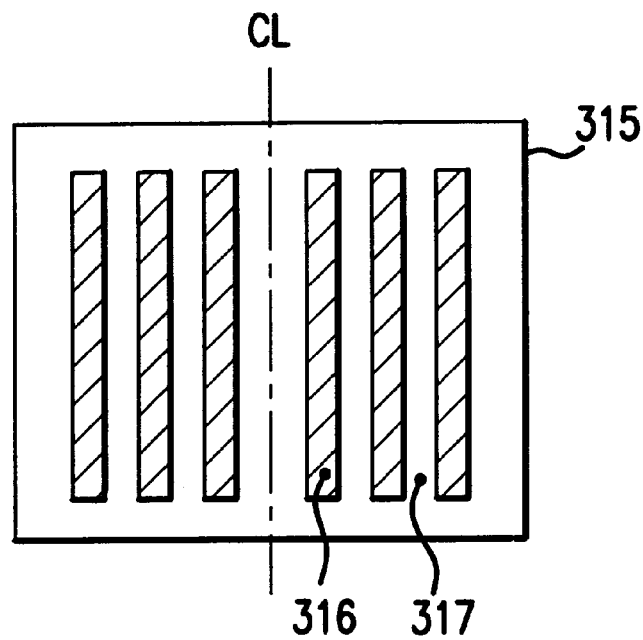

FIGS. 7(a)–(b) are plan views of the light-shielding plate 315. FIG. 7(a) shows a light-shielding plate formed using a plate member. On this plate member, nearly-rectangular open portions 317 are selectively formed. Portions other than the open portions 317 correspond to light-shielding portions 316. As the plate member for the light-shielding plate 315 shown in FIG. 7(a), a plate member of aluminum may be used. The plate member is not limited to this, and any plate member that does not transmit incident light may be used.

FIG. 7(b) shows a light-shielding plate formed by evaporating reflecting films on a light transmissive plate. In this case, portions where reflecting films are evaporated correspond to light-shielding portions 316, and portions where reflecting films are not evaporated correspond to open portions 317. As the light transmissive plate shown in FIG. 7(b), a glass plate or the like may be used. As the reflecting films to be evaporated, aluminum films or the like may be used. The light-shielding plates 315 shown in FIGS. 7(a) and 7(b) are both symmetrically formed with respect to the center line CL. The width of the light-shielding portions will be described later. Such a light-shielding plate 315 can be manufactured to negligible dimensional tolerance at low cost, compared with the polarizing conversion element array.

As mentioned with reference to FIGS. 4(a)–(c), since the polarizing conversion element array 320b (320a) is a multilayer member formed by alternately bonding the first and second light transmissive plates 321 and 322 with an optical cement, there are variations in dimensions (manufacturing errors) of produced multilayer members within the tolerances. These variations mainly result from the differences in thickness between glass plates for use as the first and second light transmissive plates and between optical cement layers. In particular, the variations are substantially affected by the differences in thickness between glass plates.

When the polarizing conversion element arrays 320a and 320b and the light-shielding plate 315 are positioned one on top of the other, the positions of the polarizing conversion element arrays 320a and 320b and the light-shielding plate 315 are "offset" from each other due to the dimensional errors and positioning errors of the polarizing conversion element arrays 320a and 320b. Since the polarizing conversion element array is produced by cutting along the cutting surfaces that form a predetermined angle θ (about 45°) with the surface of the array, as shown in FIG. 4(c), the dimensional errors thereof in actual use as shown in FIG. 6 are about 1.4 ($2^{1/2}$) times the cumulative sum of dimensional errors in thickness of the glass plates.

Figure 8:
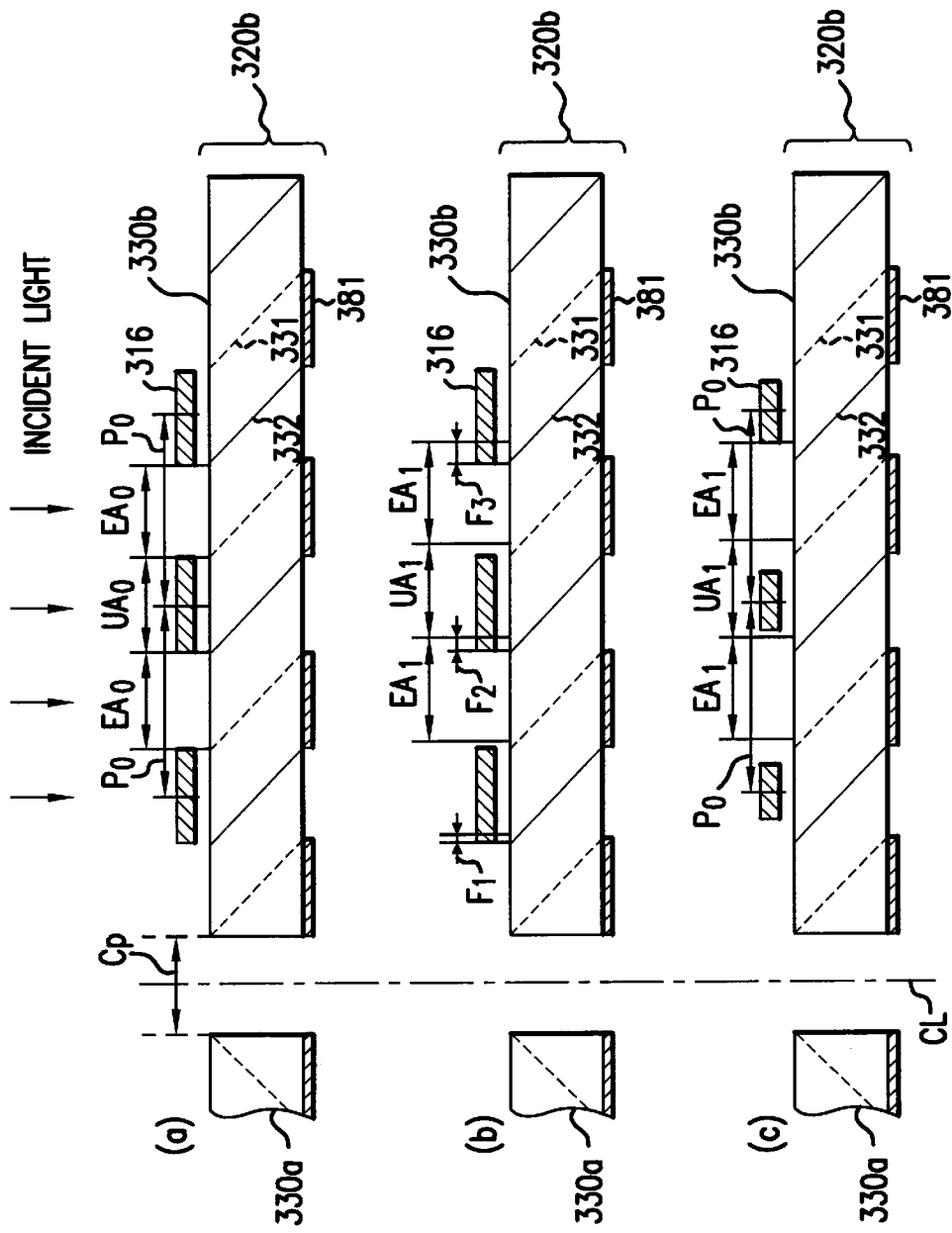
FIG. 8 is an explanatory view showing various positional relationships between the polarizing conversion element array 320b (320a) and the light-shielding plate 315.

The dimensions of the light-shielding plate 315 are set as follows, in consideration of the dimensional errors and positioning errors of the polarizing conversion element arrays 320a and 320b. FIG. 8 is an explanatory view showing various positional relationships between the polarizing conversion element array 320b (320a) and the light-shielding plate 315. Only the light-shielding portions 316 of the light-shielding plate 315 are shown in the figure. The center line CL serves as a reference line for arranging the light-shielding portions and the two polarizing conversion element arrays 320a and 320b. The light-shielding plate 315 and the two polarizing conversion element arrays 320a and 320b are placed symmetrically with respect to the center line CL. A space Cp is formed between the two polarizing conversion element arrays 320a and 320b. This space allows light, which is not sufficiently collected by the condenser lens array 310 and which enters the space Cp, to be transmitted unchanged. This makes it possible to utilize light near the center line CL without waste. In the space Cp, a member that has a refractive index equivalent to that of the two light transmissive plates 321 and 322 may be disposed to equalize the optical path length of the light passing through the space and the optical path length of the light passing through the polarizing conversion element arrays. Further, the two polarizing conversion element arrays 320a and 320b may be arranged in contact with each other without forming the space Cp. In this case, of course, the positions of the light-shielding portions 316 of the light-shielding plate 315 (FIGS. 7(a)–(b)) are changed according to the space Cp.

Portion (a) of FIG. 8 shows the positional relationship between the polarizing conversion element array 320b and the light-shielding portions 316 when the polarizing conversion element array 320b (320a) does not have dimensional errors. In this case, light enters the effective incident areas $EA_0$ of the polarizing conversion element array 320b without being blocked by the light-shielding portions 316. Such a state in which light enters the effective incident areas $EA_0$ without being blocked is preferable. In this case, the amount of effective linearly polarized light is not reduced.

Portion (b) of FIG. 8 shows the positional relationship (comparative example) between the polarizing conversion element array 320b and the light-shielding portions 316 when the polarizing conversion element array 320b (320a) has dimensional errors. Portion (b) of FIG. 8 shows a case in which the actual dimensions of the polarizing conversion element array 320b are larger than the basic dimensions and the light-shielding portions 316 have the same dimensions as those in portion (a) of FIG. 8. In this case, the positions of the effective incident areas $EA_1$ of the polarizing conversion element array 320b and the light-shielding portions 316 are increasingly offset with distance from the center line CL, and overlapping portions F1, F2, and F3 are formed between the effective incident areas $EA_1$ of the polarizing conversion element array 320b and the light-shielding portions 316. These overlapping portions F1, F2, and F3 block a part of light that is incident on the effective incident areas $EA_1$, and decrease the amount of effective linearly polarized light (e.g., s-polarized light).

Portion (c) of FIG. 8 shows the positional relationship (embodiment) between the polarizing conversion element array 320b and light-shielding portions 316', which solves the problem mentioned with reference to portion (b) of FIG. 8. The width of the light-shielding portions 316' shown in portion (c) of FIG. 8 is smaller than that of the ineffective incident areas $UA_0$ of the polarizing conversion element array 320b shown in portion (a) of FIG. 8. The distance $P_0$ between the centers of the light-shielding portions 316' is the same as that of the distance $P_0$ between the centers of the light-shielding portions 316 shown in portion (a) of FIG. 8 (i.e., the distance between the centers of the ineffective incident areas $UA_0$). In this case, the effective incident areas $EA_1$ of the polarizing conversion element array 320b and the light-shielding portions 316 do not overlap with each other, and light enters the effective incident areas $EA_1$ without being blocked. Therefore, the amount of effective linearly polarized light (e.g., s-polarized light) is the same as that of the case shown in portion (a) of FIG. 8. Although light that is incident on the ineffective incident areas $UA_1$ emerges after it is converted into ineffective linearly polarized light, in the case shown in portion (c) of FIG. 8, even when a small number of ineffective linearly polarized light components are produced, there is no problem as long as a polarizing element and the like are disposed on the emitting side.

Figure 9:
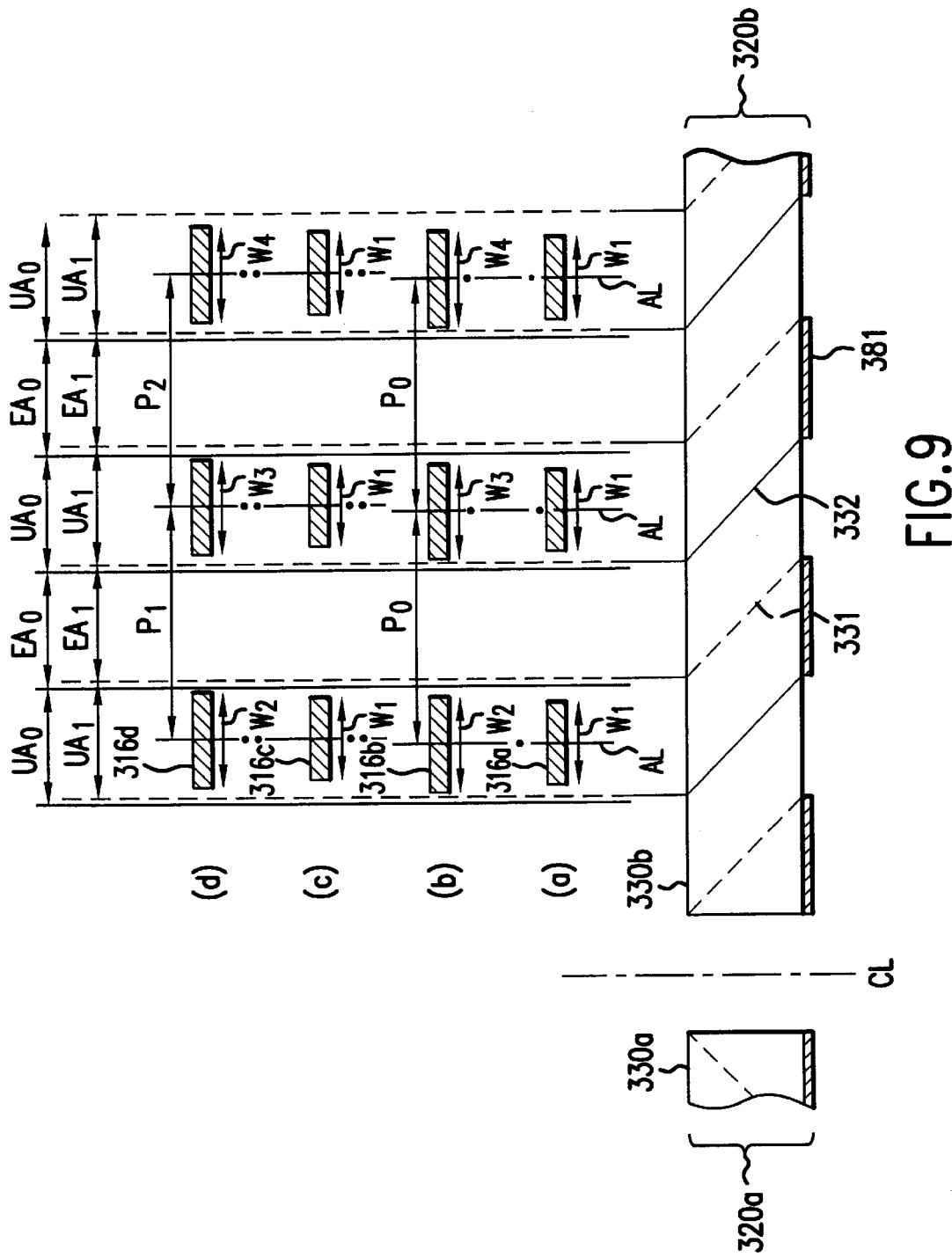
FIG. 9 is an explanatory view showing various examples of arrangement of light-shielding portions of the light-shielding plate 315.

FIG. 9 is an explanatory view showing various examples of arrangement of the light-shielding portions of the light-shielding plate 315. The polarizing conversion element array 320b shown in the lowermost part of FIG. 9 has dimensional errors, and the actual dimensions thereof are larger than the basic dimensions. Broken lines extending from portions (a) to (d) of FIG. 9 represent boundaries between the effective incident areas $EA_1$ and the ineffective incident areas $UA_1$ of the polarizing conversion element array 320b, which is shown in the lowermost part of the figure, and solid lines represent boundaries between the effective incident areas $EA_0$ and the ineffective incident areas $UA_0$ of the polarizing conversion element array that has no dimensional errors.

Four types of light-shielding portions 316a, 316b, 316c, and 316d, shown in portions (a) to (d) of FIGS. 9, have widths that are smaller than the width of the ineffective incident areas $UA_0$ of the polarizing conversion element array that does not have dimensional errors (i.e., the designed values of the ineffective incident areas $UA_0$). As a result, even when dimensional errors arise in the polarizing conversion element array, there is a low possibility that the light-shielding portions and the effective incident areas $EA_1$ may overlap with each other, and that the amount of effective linearly polarized light (e.g., s-polarized light) may be reduced.

The widths of the light-shielding portions 316a shown in portion (a) of FIG. 9 are smaller than the widths of the ineffective incident areas $UA_0$, namely, the layout pitch of the polarization separating films 331 and the reflecting films 332, and are fixed at $W_1$. The distances between the centers of the light-shielding portions 316a are the same as the distances between the centers of the ineffective incident areas $UA_0$ when there are no dimensional errors, and are fixed at $P_0$. The centers of the light-shielding portions 316a align with the center lines AL of the ineffective incident areas $UA_0$ when there are no dimensional errors. The light-shielding portions 316a shown in portion (a) of FIG. 9 are the same as the light-shielding portions 316' shown in portion (c) of FIG. 8.

The widths of the light-shielding portions 316b shown in portion (b) of FIG. 9 decrease in the order, $W_2$, $W_3$, and $W_4$, with distance from the centerline CL, and all of the widths are smaller than the width of the ineffective incident areas $UA_0$, namely, the layout pitch of the polarization separating films 331 and the reflecting films 332. The distances between the centers of the light-shielding portions 316b are equal to the distances between the centers of the ineffective incident areas $UA_0$ when there are no dimensional errors, and are fixed at $P_0$. The centers of the light-shielding portions 316b align with the center lines AL of the ineffective incident areas $UA_0$ when there are no dimensional errors. While the widths of the light-shielding portions 316b shown in portion (b) of FIG. 9 decrease in the order, $W_2$, $W_3$, $W_4$, ..., with distance from the center line CL, some of the light-shielding portions 316b may have the same width. In this specification, the phrase "the widths of the light-shielding portions decrease" implies not only the case in which the widths always decrease, but also the case in which some adjoining light-shielding portions have the same width.

The widths of the light-shielding portions 316c shown in portion (c) of FIG. 9 are smaller than the width of the ineffective incident areas $UA_0$, namely, the layout pitch of the polarization separating films 331 and the reflecting films 332, and are fixed at $W_1$. The distances between the centers of the light-shielding portions 316c are different from the distance $P_0$ between the centers of the ineffective incident areas $UA_0$ when there are no dimensional errors, and increase in the order, $P_1$, $P_2$, . . . , with distance from the center line CL. That is, the centers of the light-shielding portions 316c are increasingly offset from the center lines AL of the ineffective incident areas $UA_0$ when there are no dimensional errors, with distance from the center line CL. Some of the distances $P_1$, $P_2$, . . . (e.g., $P_1$) may be set at a value that is equal to the distance $P_0$ between the ineffective incident areas $UA_0$ when there are no dimensional errors.

The light-shielding portions 316d shown in portion (d) of FIG. 9 have the characteristics of both the light-shielding portions 316b shown in portion (b) of FIG. 9 and the light-shielding portions 316c shown in portion (c) of FIG. 9. That is, the widths of the light-shielding portions 316d decrease in the order, $W_2$, $W_3$, and $W_4$, with distance from the center line CL, and all the widths are smaller than the width of the ineffective incident areas $UA_0$, namely, the layout pitch of the polarization separating films 331 and the reflecting films 332. The distances between the centers of the light-shielding portions 316d are different from the distance $P_0$ between the centers of the ineffective incident areas $UA_0$ when there are no dimensional errors, and increase in the order, $P_1$, $P_2$, with distance from the center line CL. Therefore, the centers of the light-shielding portions 316d are increasingly offset from the center lines AL of the ineffective incident areas $UA_0$ when there are no dimensional errors, with distance from the center line CL. Referring to portions (c) and (d) of FIG. 9, the distances between the centers of the light-shielding portions increase with distance from the center line CL, while the distances between the centers of some light-shielding portions may be the same. In this specification, the phrase "the distances of the light-shielding portions increase" implies not only the case in which the distances always increase, but also the case in which the distances between some adjoining light-shielding portions are the same. This also applies to the phrase "the distances between the light-shielding portions decrease".

When the light-shielding plates 315 shown in portions (a) to (d) of FIG. 9 are used, even if some dimensional errors arise in the polarizing conversion element array 320b, there is a low possibility that light entering the effective incident areas $EA_1$ may be blocked. When the light-shielding plate shown in portion (b) of FIG. 9 is used, since the widths of the light-shielding portions decrease with distance from the center line CL, there is a high possibility that the effective incident areas $EA_1$ will not be shielded from light even when dimensional errors are larger than those of the light-shielding portions shown in portion (a) of FIG. 9. Further, when the light-shielding plate shown in portion (c) of FIG. 9 is used, since the distances between the light-shielding portions increase in order, there is a high possibility that the effective incident areas $EA_1$ will not be shielded from light even when dimensional errors are larger than those of the light-shielding plate shown in portion (a) of FIG. 9. Since the light-shielding plate shown in portion (d) of FIG. 9 has the characteristics of both the light-shielding plates shown in portions (b) and (c) of FIG. 9, the effective incident areas $EA_1$ thereof are most unapt to be shielded when the dimensional errors of the polarizing conversion element array become large.

FIG. 9 shows the case in which the actual dimensions of the polarizing conversion element array 320b are prone to be larger than the basic dimensions. For example, when the positive dimensional tolerance of the thickness of the glass plate for use in producing the polarizing conversion element array 320b is large and the negative dimensional tolerance is small, the actual dimensions of the polarizing conversion element array 320b are prone to be larger than the basic dimensions (designed values). In such a case, it is preferable that the distances between the centers of the light-shielding portions gradually increase, as shown in portions (c) and (d) of FIG. 9.

On the other hand, when the positive dimensional tolerance of the thickness of the glass plate is set to be small and the negative tolerance is set to be large, the actual dimensions of the polarizing conversion element array 320b are prone to be smaller than the basic dimensions. In this case, it is preferable that the distances between the centers of the light-shielding portions decrease with distance from the center line CL. Since overlapping portions between the light-shielding portions and the effective incident areas can also be eliminated in this case as in the case shown in FIG. 9, the effective incident areas are prevented from being shielded from light. The light-shielding plates shown in portions (a) and (b) of FIG. 9 may be used in the case in which the actual dimensions of the polarizing conversion element array are prone to be smaller than the basic dimensions.

The use of the light-shielding plates mentioned above makes it possible to prevent the amount of effective linearly polarized emitting light from decreasing, regardless of the dimensional errors of the polarizing conversion element array.

Figure 10:
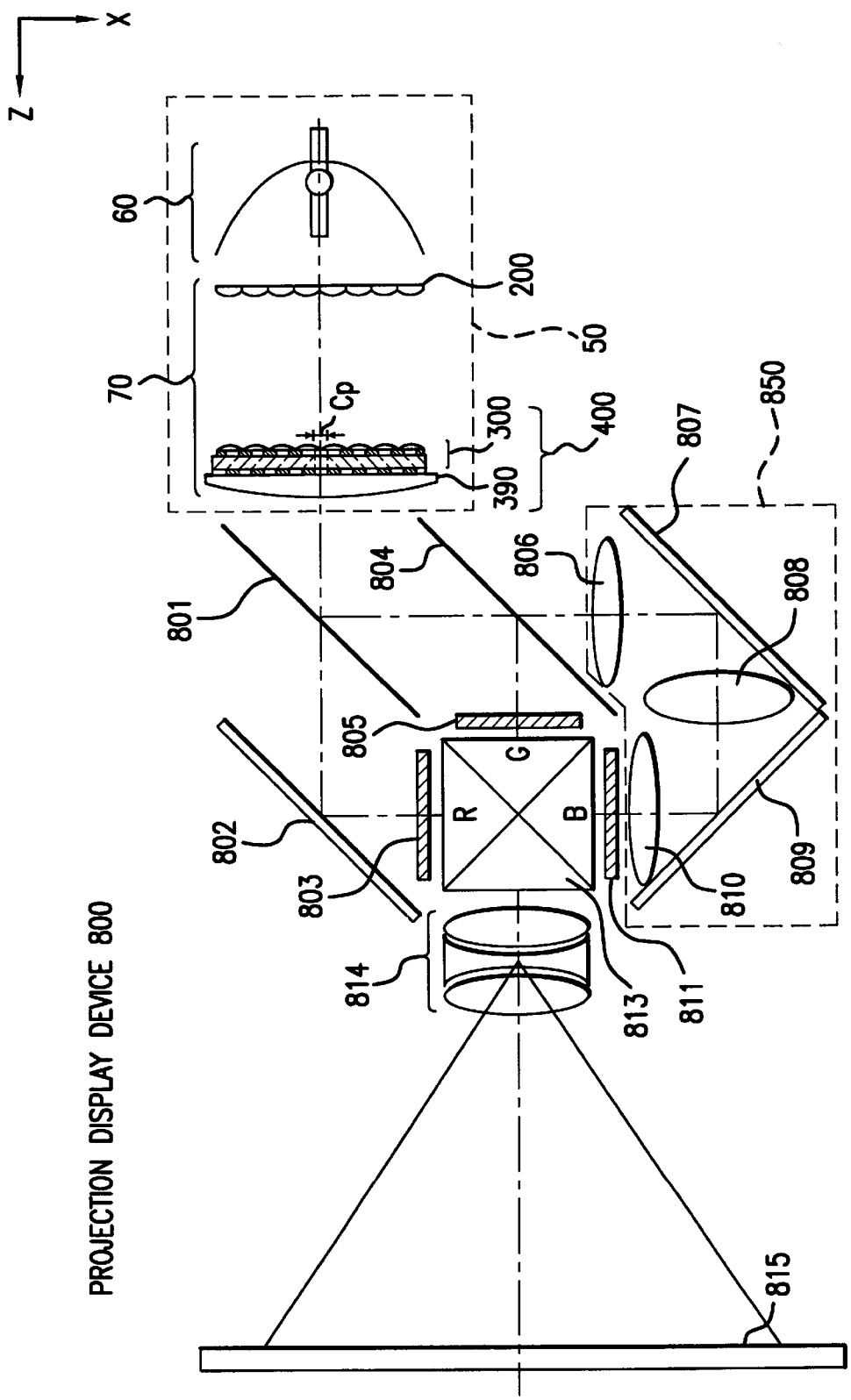
FIG. 10 is a schematic structural view showing the principal part of a projection display device 800 including the polarizing illumination device 50 shown in FIG. 2.

FIG. 10 is a schematic structural view showing the principal part of a projection display device 800 that includes the polarizing illumination device 50 shown in FIG. 2. This projection display device 800 includes the polarizing illumination device 50, dichroic mirrors 801 and 804, reflecting mirrors 802, 807, and 809, relay lenses 806, 808, and 810, three liquid crystal light valves 803, 805, and 811, a cross-dichroic prism 813, and a projection lens 814.

The dichroic mirrors 801 and 804 function as a colored-light separation device for separating a light beam emitted from the polarizing illumination device 50 into colored lights of three colors, i.e., red, blue, and green. The three liquid crystal light valves 803, 805, and 811 function as a modulation device for forming images by modulating the three colored lights according to given image information (image signals). The cross-dichroic prism 813 functions as a colored-light synthesizing device for forming a color image by synthesizing the three colored lights. The projection lens 814 functions as a projection optical device for projecting the synthesized light representing a color image onto a screen 815.

The blue and green light reflecting dichroic mirror 801 transmits a red light component of a light beam emitted from the polarizing illumination device 50, and reflects blue and green light components. The transmitted red light is reflected by the reflecting mirror 802, and reaches the liquid crystal light valve for red light 803. On the other hand, the green light of the blue and green light reflected by the first dichroic mirror 801 is reflected by the green-light reflecting dichroic mirror 804, and reaches the liquid crystal light valve for green light 805. On the other hand, the blue light passes through the second dichroic mirror 804.

In this embodiment, the blue light of the three colored lights has the longest optical path. Accordingly, for the blue light, a light guide device 850 including the incident lens 806, an intermediate lens 808, and an emitting lens 810 is disposed behind the dichroic mirror 804. That is, after being transmitted through the green-light reflecting dichroic mirror 804, the blue light first passes through the incident lens 806 and the reflecting mirror 807, and is guided to the intermediate lens 808. Furthermore, the blue light is reflected by the reflecting mirror 809, is guided to the emitting lens 810, and reaches the liquid crystal light valve for blue light 811. The three liquid crystal light valves 803, 805, and 811 correspond to the illumination area 80 shown in FIG. 2.

The three liquid crystal light valves 803, 805, and 811 modulate the colored lights according to image signals (image information) given from an external control circuit, which is not shown, and generate colored lights containing image information about the color components. The three modulated colored lights enter the cross-dichroic prism 813. In the cross-dichroic prism 813, a dielectric multilayer film for reflecting red light and a dielectric multilayer film for reflecting blue light are formed in the shape of a cross. The three colored lights are synthesized by these dielectric multilayer films, thereby forming light representing a color image. The synthesized light is projected onto the screen 815 by the projection lens 814 that serves as a projection optical system, whereby an enlarged image is displayed.

Light beams that are collected by the condenser lens array 310 (FIG. 6) and are incident on the polarization separating films 331, of light beams that are incident on the optical device 300 in the polarizing illumination device 50, are converted into effective linearly polarized light (e.g., s-polarized light), and are then emitted, as mentioned above. The light beams emerging from the optical device 300 are superimposed on the liquid crystal light valves 803, 805, and 811 by the emitting-side lens 390.

This projection display device 800 employs, as a modulation device, the liquid crystal light valves 803, 805, and 811 that modulate light beams polarized in a specific direction (e.g., s-polarized light). These liquid crystal light valves usually have polarizers (not shown) on the incident and emitting sides thereof. Therefore, only predetermined polarized light, e.g., s-polarized light, passes through the incident-side polarizer of the liquid crystal light valve, is modulated, and enters the cross-dichroic prism 813.

Light beams, which are not collected by the condenser lens array 310 and are radiated onto the reflecting films 332, of light beams that are incident on the optical device 300, are converted into p-polarized light and then are emitted, as mentioned above, and are directed toward the liquid crystal light valves 803, 805, and 811. As mentioned above, however, when polarizers are disposed on the incident sides of the liquid crystal light valves 803, 805, and 811, unnecessary p-polarized light can be blocked by absorption. Although heat arises in the polarizers with the absorption of the p-polarized light in this case, since the polarizing illumination device 50 in the projection display device 800 has the light-shielding plate mentioned above, the heat arising in the polarizers can be limited to a negligible small amount. Light beams having passed through the space Cp in the optical device 300 emerge unchanged without being converted, and illuminate the liquid crystal light valves 803, 805, and 811. Since this illumination light contains an s-polarized light component that can be used in the liquid crystal light valves 803, 805, and 811, only the s-polarized light component of the light radiated onto the liquid crystal light valves 803, 805, and 811 can be used. Since the projection display device 800 shown in FIG. 10 thus uses the light-shielding plate 315 (FIG. 9) according to the embodiment, it is possible to prevent the polarizers from generating heat, and to supply effective linearly polarized light (s-polarized light in this embodiment) to the liquid crystal light valves 803, 805, and 811 without reducing the amount of the light.

As mentioned above, the use of the light-shielding plate according to the embodiment makes it possible to prevent a decrease in the amount of the linearly polarized light that is effective in the polarizing illumination device. Therefore, in the projection display device having such a polarizing illumination device, it is possible to prevent the luminance from being lowered due to the addition of the light-shielding plate.

The present invention is not limited to the above-mentioned embodiment, and may be carried out by various modes without departing from the scope of the invention. For example, the following modifications may be made.

(1) While the two polarizing conversion element arrays 320a and 320b are arranged so as to face each other with reference to the center line CL, as shown in FIG. 9, in the above embodiment, the polarizing conversion element arrays may be combined. That is, since the polarizing conversion element array only need to have effective incident areas corresponding to the lenses in the condenser lens array 310 (FIG. 2), a polarizing conversion element array, in which all polarization separating films and reflecting films are arranged in parallel, may be used. In this case, it is also preferable that a light-shielding plate be formed with reference to the center line of the polarizing conversion element array.

(2) While the light-shielding plate is formed symmetrically with respect to the center line CL, as shown in FIGS. 7(a)–(b), in the above embodiment, it does not have to be symmetrical with respect to the center line CL. That is, the light-shielding plate may be formed so that the polarizing conversion element array and the light shielding plate can be arranged with reference to a common reference position. For example, when the polarizing conversion element array is of an integral type and the reference position is the end of the polarizing conversion element array, light-shielding portions of the light-shielding plate are formed with reference to the end.

(3) While the light-shielding portions are provided in the light-shielding plate 315 in the above embodiment, they do not have to be provided in the light-shielding plate. That is, the light-shielding portions may be directly formed on the polarizing conversion element arrays 320a and 320b, and, for example, Al or the like may be evaporated on the ineffective incident areas of the polarizing conversion element arrays 320a and 320b. In usual cases, a mask is put on during evaporation, and light-shielding portions may be evaporated, as shown in FIG. 9, in consideration of the dimensional tolerances of the polarizing conversion element arrays and the positioning errors in putting on the mask.

(4) The polarizing illumination device of the present invention may be applied not only to the projection display device shown in FIG. 10, but also to other various devices. For example, the polarizing illumination device of the present invention may be applied to a projection display device for projecting a monochrome image instead of a color image. In this case, only a single liquid crystal light valve is needed in the device shown in FIG. 10, and a colored-light separation device for separating a light beam into three colors and a colored-light synthesizing device for synthesizing the three colored lights can be omitted. Further, the present invention may also be applied to a color projection display device using only one light valve. Still further, the present invention may also be applied to a projection display device using a reflective-type light valve, and an image display device using polarized illumination light, such as a rear-type display device.

What is claimed is:

1. A polarizing illumination device that generates one type of polarized light, comprising:

a) a light source;

b) a polarizing conversion element array that converts light emitted from said light source into a first type of linearly polarized light; and c) a plurality of light-shielding portions that blocks a part of light that is incident on the light incident surface of said polarizing conversion element array, said polarizing conversion element array comprising:

1) a polarization beam splitter array having a light separating surface that separates the light from said light source into the first type of linearly polarized light and a second type of linearly polarized lights, and 2) a selective phase plate selectively disposed on a light emitting surface of said polarization beam splitter array to convert the second type of linearly polarized light into the first type of linearly polarized light, said polarization beam splitter array having a plurality of polarization separating films and a plurality of reflecting films alternately arranged along a predetermined direction with an arrangement space there between, said plurality of light-shielding portions being arranged nearly in parallel with the predetermined direction and having set widths, and the widths of said plurality of light-shielding portions along the predetermined direction being smaller than the arrangement space between said polarization separating films and said reflecting films along the predetermined direction.

2. A polarizing illumination device according to claim 1, said polarizing conversion element array having a center and said plurality of light-shielding portions being arranged so that distances therebetween increase from the center of said polarizing conversion element array.

3. A polarizing illumination device according to claim 1, said polarizing conversion element array having a center and said plurality light-shielding portions are arranged so that distances therebetween decrease from the center of said polarizing conversion element array.

4. A polarizing illumination device according to claim 1, said polarizing conversion element array having a center and the widths of said plurality of light-shielding portions being set to decrease from the center of said polarizing conversion element array.

5. A projection display device that projects an image, said projection display comprising:

a) a polarizing illumination device that generates one type of polarized light;

b) a modulation device that modulates emitting light from said polarizing illumination device according to a given image signal; and c) a projection optical device that projects the light modulated by said modulation device, said polarizing illumination device comprising:
1) a light source;
2) a polarizing conversion element array that converts light emitted from said light source into a first type of linearly polarized light; and
3) a plurality of light-shielding portions that block a part of light that is incident on the light incident surface of said polarizing conversion element array, said polarizing conversion element array comprising:
a polarization beam splitter array having a light separating surface that separates the light from said light source into the first type of linearly polarized light and a second type of linearly polarized light; and
a selective phase plate selectively disposed on a light emitting surface of said polarization beam splitter array to convert the second type of linearly polarized light into the first type of linearly polarized light, said polarization beam splitter array having a plurality of polarization separating films and a plurality of reflecting films alternately arranged along a predetermined direction with an arrangement space therebetween, said plurality of light-shielding portions being arranged nearly in parallel with the predetermined direction and having set widths, and the widths of said plurality of light-shielding portions along the predetermined direction being smaller than the arrangement space between said polarization separating films and said reflecting films along the predetermined direction.

6. A projection display device according to claim 5, said polarizing conversion element array having a center and said plurality of light-shielding portions having selective distances therebetween, said plurality of light-shielding portions being arranged so that the distances therebetween increase from the center of said polarizing conversion element array.

7. A projection display device according to claim 5, said polarizing conversion element array having a center and said plurality of light-shielding portions having selective distances therebetween, said plurality of light-shielding portions being arranged so that the distances therebetween decrease from the center of said polarizing conversion element array.

8. A projection display device according to claim 5, said polarizing conversion element array having a center and the widths of said plurality of light-shielding portions being set to decrease from the center of said polarizing conversion element array.

* * * * *